(12) United States Patent
Schildbach et al.

(10) Patent No.: US 12,395,686 B2
(45) Date of Patent: Aug. 19, 2025

(54) METHODS AND DEVICES FOR PROVIDING PERSONALIZED AUDIO TO A USER

(71) Applicant: Dolby International AB, Amsterdam (NL)

(72) Inventors: Wolfgang Schildbach, Nuremberg (DE); Malte Schmidt, Feucht (DE)

(73) Assignee: Dolby International AB, Dublin (IE)

( * ) Notice: Subject to any disclaimer, the term of this patent is extended or adjusted under 35 U.S.C. 154(b) by 0 days.

(21) Appl. No.: 17/780,950

(22) PCT Filed: Nov. 27, 2020

(86) PCT No.: PCT/EP2020/083640
§ 371 (c)(1),
(2) Date: May 27, 2022

(87) PCT Pub. No.: WO2021/105370
PCT Pub. Date: Jun. 3, 2021

(65) Prior Publication Data
US 2023/0007321 A1    Jan. 5, 2023

Related U.S. Application Data (60) Provisional application No. 63/040,129, filed on Jun. 17, 2020, provisional application No. 62/961,465, filed on Jan. 15, 2020.

(30) Foreign Application Priority Data

Nov. 28, 2019  (EP) .................................... 19212079

(51) Int. Cl.
| | | |
|---|---|---|
| G06F 15/16 | (2006.01) | |
| H04N 21/2343 | (2011.01) | |
| H04N 21/2662 | (2011.01) | |
| H04N 21/439 | (2011.01) | |

(Continued)

(52) U.S. Cl.
CPC ... *H04N 21/23439* (2013.01); *H04N 21/2662* (2013.01); *H04N 21/439* (2013.01); *H04N 21/8352* (2013.01); *H04N 21/84* (2013.01)

(58) Field of Classification Search
CPC ......... H04N 21/23439; H04N 21/2662; H04N 21/439; H04N 21/8352; H04N 21/84
(Continued)

(56) References Cited

U.S. PATENT DOCUMENTS 9,148,682 B2   9/2015   Keum
9,787,652 B2   10/2017  Wang
(Continued)

FOREIGN PATENT DOCUMENTS

| EP | 1679827 B1 | 3/2012 |
| GB | 2567485 B | 7/2020 |
| WO | 2017136354 A1 | 8/2017 |

OTHER PUBLICATIONS

ISO/IEC 14496-3 Information Technology—Coding of Audio-Visual Objects, 4th Edition, Sep. 1, 2009.

*Primary Examiner* — Alan S Chou (57) ABSTRACT

The present application describes a method (400) for providing personalized audio to a user. The method (400) comprises receiving (401) a manifest file (140) for a media element from which audio is to be rendered, wherein the manifest file (140) comprises a description (141) for a plurality of different presentations (152) of audio content of the media element. In addition, the method (400) comprises selecting (402) a presentation (152) from the plurality of presentations (152) based on the manifest file (140). The method (400) further comprises receiving (403) a list of audio track objects comprised within the media element, and (Continued)

selecting (404) an audio track object from the list of audio track objects, in dependence of the selected presentation (152).

17 Claims, 5 Drawing Sheets

(51) Int. Cl.
  *H04N 21/8352* (2011.01)
  *H04N 21/84* (2011.01)

(58) Field of Classification Search
  USPC .......................................................... 709/231
  See application file for complete search history.

(56) References Cited

U.S. PATENT DOCUMENTS

| | | | |
|---|---|---|---|
| 9,854,375 B2 | 12/2017 | Stockhammer | |
| 10,742,705 B2* | 8/2020 | Kwak | H04H 20/93 |
| 2011/0093492 A1 | 4/2011 | Sull | |
| 2013/0297467 A1 | 11/2013 | Kidron | |
| 2015/0281303 A1* | 10/2015 | Yousef | H04L 67/02 709/219 |
| 2016/0192296 A1* | 6/2016 | Rehan | H04N 21/23439 455/574 |
| 2017/0180803 A1* | 6/2017 | Lee | H04N 21/4345 |
| 2017/0374429 A1* | 12/2017 | Yang | H04N 7/08 |
| 2018/0176278 A1 | 6/2018 | Mandyam | |
| 2018/0278971 A1 | 9/2018 | Wang | |
| 2018/0288500 A1* | 10/2018 | Stockhammer | H04N 21/23614 |
| 2019/0014165 A1 | 1/2019 | Stockhammer | |
| 2019/0115009 A1* | 4/2019 | Misra | H04H 60/58 |
| 2019/0215351 A1 | 7/2019 | Gordon | |
| 2019/0349630 A1 | 11/2019 | Stockhammer | |
| 2021/0211780 A1* | 7/2021 | Deshpande | H04N 21/8106 |
| 2022/0417617 A1* | 12/2022 | Zhao | H04N 21/8547 |

* cited by examiner

METHODS AND DEVICES FOR PROVIDING PERSONALIZED AUDIO TO A USER

CROSS-REFERENCE TO RELATED APPLICATIONS

This application claims priority of the following priority applications: EP application 19212079.8 (reference: D19140EP), filed 28 Nov. 2019, U.S. provisional application 62/961,465 (reference: D19140USP1), filed 15 Jan. 2020 and U.S. provisional application 63/040,129 (reference: D19140USP2), filed 17 Jun. 2020, which are hereby incorporated by reference.

TECHNICAL FIELD

The present document relates to methods and devices for providing personalized audio signals to a user, notably a listener.

BACKGROUND

Modern television (TV) sets enable a user to load software applications onto a platform of the TV set. The platform may be viewed as a browser and the application may be a plugin extension of the browser. The software application may e.g. be provided by a content provider, and it may allow the user to select audio and/or video content from a server of the content provider.

A possible context for providing personalized audio and/or video content to a user is the HbbTV (Hybrid broadcast broadband TV) environment, with the specification ETSI TS 102 796. HbbTV makes use of the HTML5 (hypertext markup language) protocol, which comprises the so-called Media Source Extensions (MSE) application programming interface (API) for enabling content providers to provide software applications for new services (e.g. in the context of Video on Demand, VOD). The MSE API specifies a communication interface which allows an application, e.g. an application on a TV set, to communicate with the browser (also referred to herein as the terminal) of the TV set.

The present document addresses the technical problem of enabling personalization of audio content, notably via the MSE API of HTML5, in an efficient and reliable manner. The technical problem is solved by the independent claims. Preferred examples are described in the dependent claims.

SUMMARY

According to an aspect, a device and/or apparatus, notably an application unit or a device running an application, for providing personalized audio to a user is described. The device is configured to receive a manifest file for a media element from which audio is to be rendered, wherein the manifest file comprises a description for a plurality of different presentations of audio content of the media element. The descriptions of the different presentations may describe the presentations in such a way that they allow the user to select an appropriate presentation for rendering. Furthermore, the device is configured to select a presentation from the plurality of presentations based on the manifest file (notably based on the descriptions comprised within the manifest file). In addition, the method is configured to receive a list of audio track objects comprised within the media element, and to select an audio track object from the list of audio track objects, in dependence of the selected presentation (and based on knowledge and/or information regarding the ordering of the audio track objects within the list of audio track objects).

According to a further aspect, a device and/or apparatus, notably a terminal, for providing personalized audio to a user is described. The device is configured to receive an initialization segment for a media element from which audio is to be rendered. Furthermore, the device is configured to determine a list of audio track objects for a plurality of different presentations of the media element, based on the initialization segment, and to provide the list of audio track objects for selection of one of the audio track objects for one of the plurality of different presentations. The list of audio track objects may be ordered according to an ordering scheme which is known to the entity (notably to the application) which performs the selection of an audio track object.

According to an aspect, a method for providing personalized audio to a user is described. The method comprises receiving a manifest file for a media element from which audio is to be rendered, wherein the manifest file comprises a description for a plurality of different presentations of audio content of the media element. In addition, the method comprises selecting a presentation from the plurality of presentations based on the manifest file. The method further comprises receiving a list of audio track objects comprised within the media element, and selecting an audio track object from the list of audio track objects, in dependence of the selected presentation.

According to a further aspect, a method for providing personalized audio to a user is described. The method comprises receiving an initialization segment for a media element from which audio is to be rendered. In addition, the method comprises determining a list of audio track objects for a plurality of different presentations of the media element, based on the initialization segment, and providing the list of audio track objects for selection of one of the audio track objects for one of the plurality of different presentations.

It should be noted that the methods described herein can each be implemented in software and/or computer readable code on one or more processors, in whole or in part of the respective methods.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein.

DETAILED DESCRIPTION

Figure 1A:
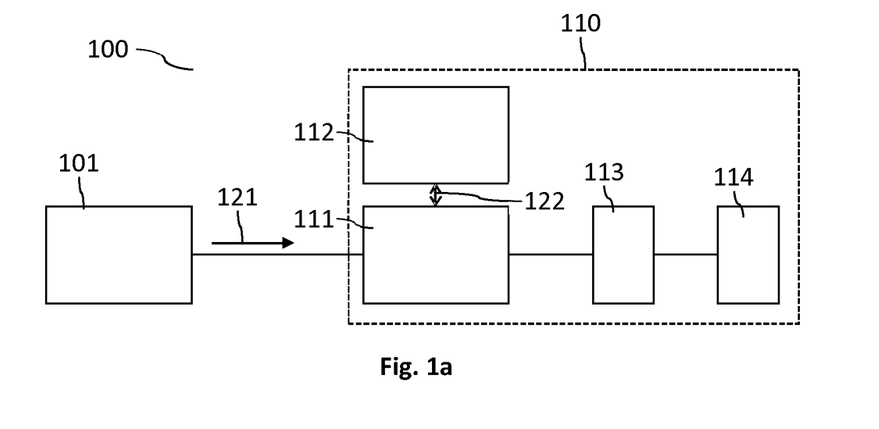
FIG. 1a shows an example content distribution network.

As indicated above, the present document relates to providing personalized audio content to a listener, notably using HTML5 and the Media Source Extension (MSE) API. In this context FIG. 1 shows an example content distribution (notably broadcasting) network 100 with a network server 101 which is configured to provide audio and/or video content, e.g. an audio bitstream 121, to a content receiver 110. The network server 101 may be operated by a content provider.

The content receiver 110 comprises a terminal 111 which is configured to provide video and/or audio content to a decoder 113 and subsequently to a rendering unit 114 (e.g. a loudspeaker). Furthermore, the content receiver 110 comprises an application 112, which is typically provided by the content provider. The application 112 may be executed on a hardware platform (which may be integrated within a TV set). The terminal 111 and the application 112 may communicate with one another via an Application Programming Interface 112, e.g. the HTLM5 API or the MSE API.

The content receiver 110 may be implemented using a single computing entity (such as a TV set) or the content receiver 110 may be implemented within multiple computing entities (e.g. an entity for the terminal or browser 111 and a separate entity for the application 112).

The audio content may be provided from the server 101 to the receiver 110 using the Dynamic Adaptive Streaming over HTTP (DASH), notably the MPEG-DASH, protocol. The DASH protocol is an adaptive bitrate streaming scheme which enables streaming of media (notably video and/or audio) content over the internet from an HTTP web server 101. The DASH protocol is specified in ISO/IEC 23009-1: 2019 Information technology—Dynamic adaptive streaming over HTTP (DASH)—Part 1: Media presentation description and segment formats" (see https://www.iso.org/standard/79329.html), which is incorporated herein by reference.

The DASH protocol enables the transmission of an audio bitstream 121 (for a media element) from the server 101 to the receiver 110, wherein the audio bitstream 121 may comprise a plurality of different audio components (e.g. for different languages, for narrative content, for background music content, for audio effects content, etc.). Furthermore, the DASH protocol enables the definition of different presentations which specify different combinations of one or more of the different audio components or audio objects. A presentation may specify the one or more audio components or objects from the plurality of different audio components that are to rendered jointly; and/or how the one or more audio components or objects are to be mixed together for rendering.

Figure 1B:
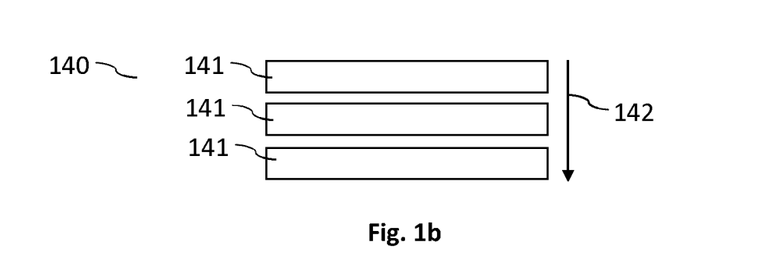
FIG. 1b shows example content of a (Dynamic Adaptive Streaming over HTTP, DASH) manifest, i.e. a Media Presentation Description, file.
Figure 1C:
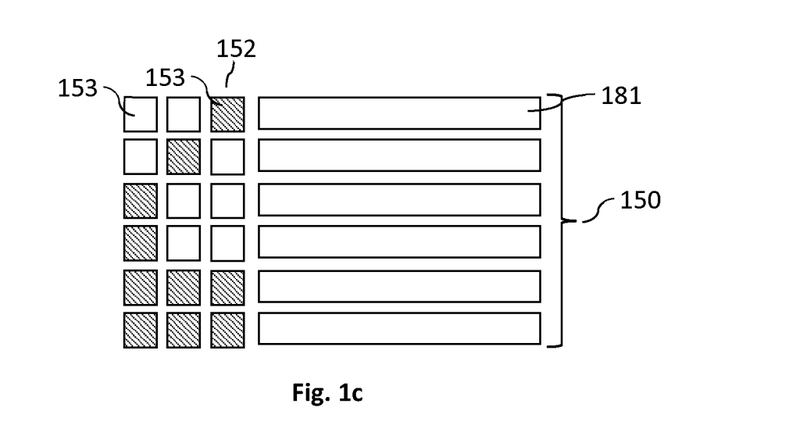
FIG. 1c shows example presentations of audio components within an audio bitstream.
Figure 1D:
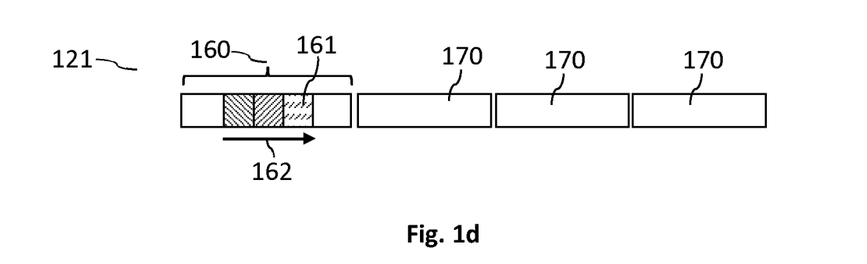
FIG. 1d shows an example initialization segment of an audio bitstream or media element.
Figure 1E:
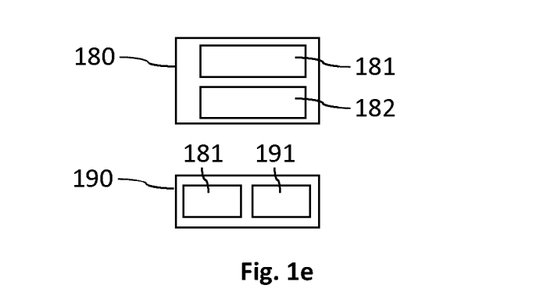
FIG. 1e shows an example adaptation set and an example preselection for enabling a personalized presentation of audio content.

Possible means for defining a presentation are the so-called adaptation sets and/or the so-called preselections (as shown in FIG. 1e). The DASH protocol allows different audio components (e.g. for different languages) to be assigned to different adaption sets 180. An adaptation set 180 may comprise one or more audio components or audio objects 181. Different adaption sets 180 may e.g. be used to define different sets of audio components 181 for different groups of listeners (e.g. for different languages). In order to reduce the required bandwidth for an audio bitstream 121, the bitstream 121 may only comprise a subset of the overall number of adaptation sets 180 which are available for a particular video and/or audio content (or media element).

A further means for defining a presentation are preselections or preselection elements 190. A preselection specifies one or more audio components or objects 181 (from an adaptation set 180) and a metadata set 191 which specifies how the one or more audio components 181 are to be mixed together. In particular, a preselection may specify how the one or more audio components 181, 182 of an adaptation set are to be mixed together. By providing different preselections with different metadata sets 191, different presentations (e.g. with different emphasis on the narrative content or on the music and/or effects content) may be specified in a bit-rate efficient manner.

The DASH protocol specifies a so-called manifest file, which is an XML file that indicates and describes the different components which are comprised within an audio bitstream 121 or a media element. FIG. 1b shows an example manifest file 140 which indicates descriptions 141 for a number of different presentations, wherein the descriptions 141 for the different presentations may be listed within the manifest file 140 according to a particular manifest file order 142. The manifest file 140 may provide a description 141 for each of the different presentations which are available within the audio bitstream 121 or media element. The description 141 may be understandable by a user, and may therefore enable the user to select a particular presentation from the media element for rendering. By way of example, the manifest file 140, notably the descriptions 141, may indicate which languages are available and/or which types of mixes of different audio components 181, 182 are available.

FIG. 1c illustrates an example set 150 of audio components or objects 181 that is provided within an audio bitstream 121 or that is provided for a media element (e.g. within an adaptation set 180 of the audio bitstream 121). A presentation 152 may be specified in an efficient manner by providing indicators 153 that enable (dashed box) or disable (clear box) the different audio components or objects 181 individually.

FIG. 1d shows an example structure of an audio bitstream 121. The audio bitstream 121 may comprise an initialization segment 160 which specifies the different presentations 152 which are available within the audio bitstream 121. In particular, the initialization segment 160 may comprise a plurality of presentation sections 161 indicating the different presentations 152 which are available. The presentation sections 161 may be provided within the initialization segment 160 according to a particular segment order 162.

The initialization segment 160, notably the different presentation sections 161, may indicate so-called audio track objects, wherein each audio track object corresponds to a particular presentation 152. Based on the initialization segment 160 and/or based on the one or more adaptation sets and/or preselection elements in the manifest file 140, a list of audio track objects for a corresponding list of presentations 152 may be generated (by parsing the initialization segment 160). The list of audio track objects may be ordered according to the segment order 162 (which may differ from the manifest file order 142).

Furthermore, the audio bitstream 121 typically comprises media, notably audio, segments 170 comprising one or more audio components or objects 181. The media segments 170 (which may also be referred to as audio bitstream segment) which are relevant for a particular presentation 152 may be indicated by the presentation section 161 for the presentation 152. A media segment 170 may correspond to a certain temporal excerpt of the audio content (e.g. to 20 ms of audio content).

As outlined above, the present document is directed at providing mechanisms for personalized interfaces for providing audio tracks, notably in the context of a Hybrid Broadcast Television (HbbTV) environment. In particular, the present document is directed at enabling the Media Source Extensions (MSE) API for the use of personalization. In this context, a scheme is described which allows matching the list of possible selections or presentations known to the application 112 (which sits on one side of the MSE API) to the list of selections or presentations known to the terminal 111 (which sits on the other side of the MSE API).

The term "audio track" (or audio component or object 181) may refer to an interface representing a single audio track from one of the HTML media elements, <audio> or <video>. A possible use for accessing an AudioTrack 181 is to toggle its "enabled" property 153 in order to mute and unmute the track or object 181. Details are described in https://html.spec.whatwg.org/multipage/media.html #audiotrack or https://developer.mozilla.org/en-US/docs/Web/API/AudioTrack), which are incorporated herein. An "AudioTrack object" may be defined as a class defined by W3C to identify an entity that can be selected and/or played on its own.

A "file audio track" may be a track as defined in ISO/IEC 14496-12, section 3.1.19 (which is incorporated herein). The "file audio track" holds a sequence of access units comprising an elementary stream, as defined in section 8.3 of that document. An "initialization segment" 160 may be defined as a sequence of bytes that contain all of the initialization information required to decode a sequence of media segments 170, as specified e.g. in https://www.w3.org/TR/2016/REC-media-source-20161117/#init-segment, which is incorporated herein.

The AudioTrack element or AudioTrack object may be used for personalization. Different personalized experiences may be variants derived from a common set 150 of components or objects 181, with some components or objects 181 being switched on or off. For example, where an English version of a documentary may be the music and effects track mixed with an English dialog, a German version may be derived by mixing the same music and effects track with a German dialog.

Traditionally, the mixing of different personalized experiences would likely have happened at a mixer's desk, located in a production studio. Due to advances in compression technology, next generation audio codecs are able to provide all the different components 181 directly to the receiver 110 in one bitstream 121, which enables the user to choose and personalize the experiences to a greater extent and in a flexible manner.

Standards for receivers 110 have defined functionality for distributing and signaling such multi-component streams 121 to receivers 110. A receiver 110 may be implemented in a software environment resembling that of a standardized web browser. The present document is directed at the functionality of selecting one experience (also referred to herein as a presentation) 152 out of several different possible presentations 152.

Figure 2:
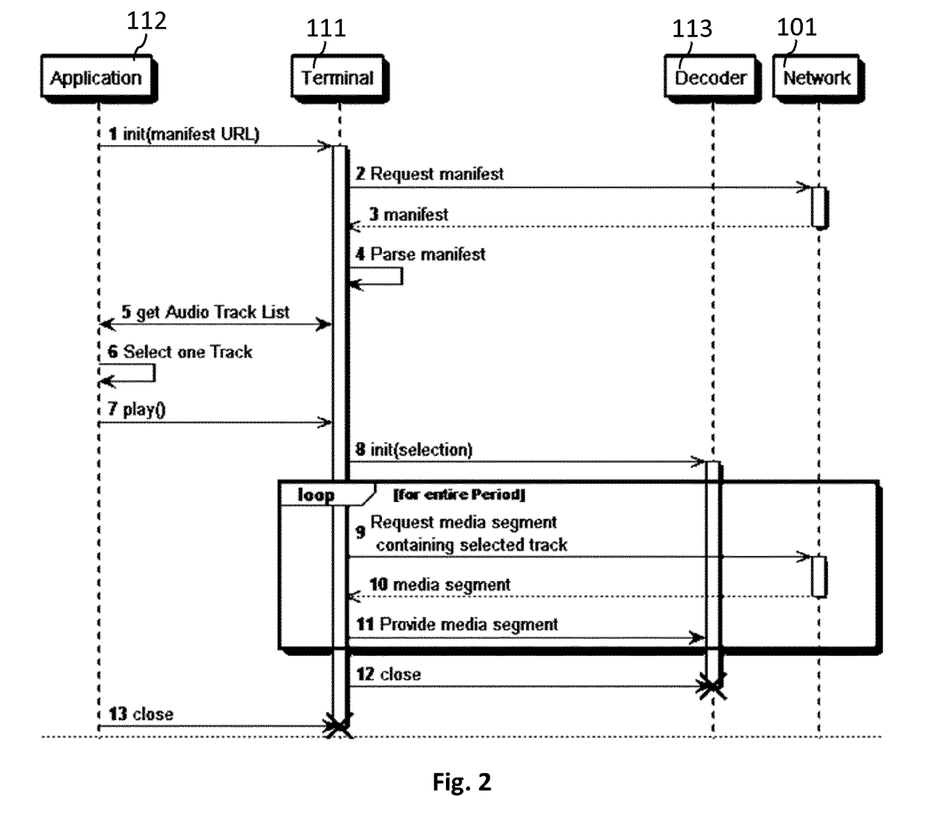
FIG. 2 shows an example protocol for selecting a personalized presentation using the HTML5 API.
Figure 3:
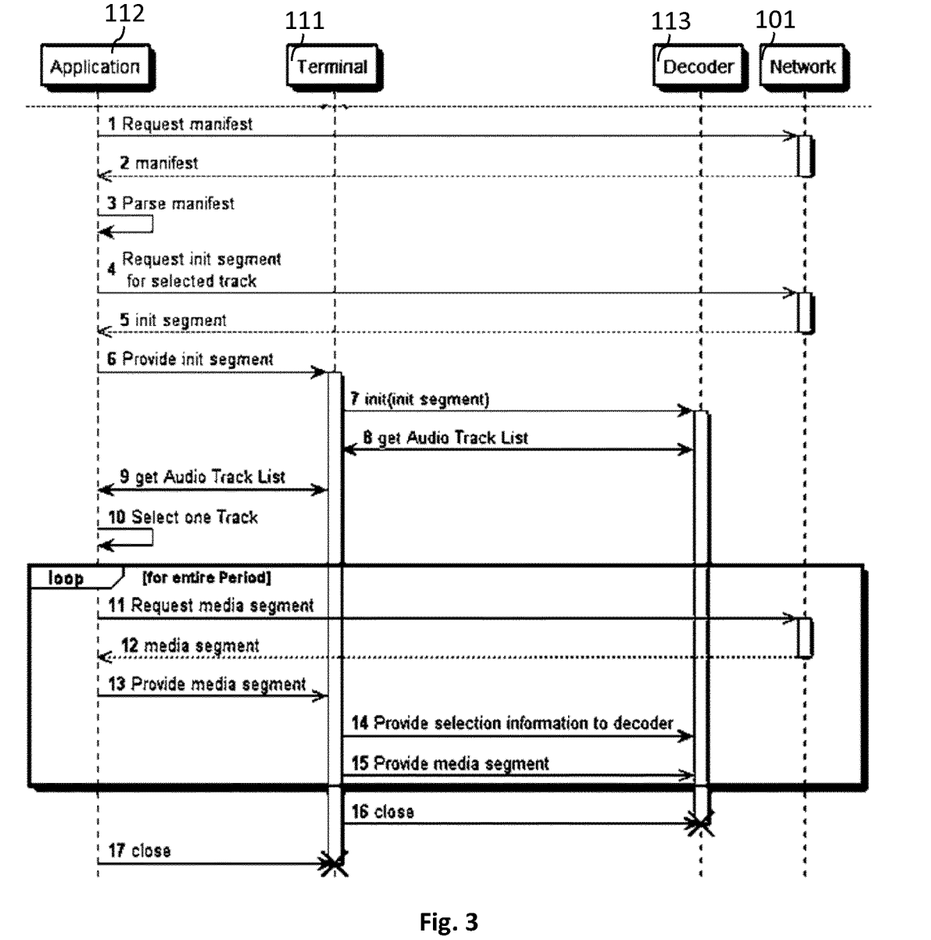
FIG. 3 shows an example protocol for selecting a personalized presentation using the MSE API.

As an example, for playback using an HTML5 media element in an HbbTV browser, the W3C specification for HTML5 in tandem with the HbbTV specification TS 102 796 V1.4.1 or higher (which are incorporated herein by reference) specify an interface that enables discovery and selection of individual presentations 152. However, if the HTML5 media element is used outside of an HbbTV environment, or if the Media Source Extensions are used for playback, then no such interface is available. FIG. 2 illustrates an example protocol for presentation selection in HbbTV, using e.g. the HTML5 API 122. FIG. 3 illustrates an example protocol for presentation selection, using e.g. the MSE API 122.

With regard to FIG. 2, the application 112 may initialize an HTML5 media element with a URL (Uniform Resource Locator) pointing to a manifest file 140 stored on a network server 101. The terminal 111 may download and parse the manifest file 140. Furthermore, the terminal 111 may populate a list of AudioTrack objects, which are available within the HTML5 media element. The list of AudioTrack objects may be generated based on the Preselections 190 (if available) and/or the AdaptationSets 180 comprised within the media element.

The application 112 may be configured to retrieve the list of AudioTrack objects from the terminal 111 via the HTML5 API 122. Furthermore, the application 112 may be configured to match the AudioTrack objects to information 141 regarding the different presentations 152 which is available within the manifest file 140, and/or with a-priori information. Based on the matching, a particular presentation 152 (notably preselection) may be selected to be played by enabling the corresponding AudioTrack object, i.e. the corresponding presentation 152.

The terminal 111 may be configured to configure the decoder 113 to play the selected presentation 152. Furthermore, the terminal 111 may be configured to download the media segments 170 for the selected presentation 152 from the network server 101, and provide the downloaded segments 170 to the decoder 113 for rendering.

Information relating to performing the steps of the protocol shown in FIG. 2 can be found in the specification of HbbTV 2.0.2 and the W3C specification, including specifically using the W3C standardized AudioTrack object (which are incorporated by reference herein). The HTML5 media element may be available for TV native applications 112. Furthermore, the HTML5 media element may be available on a browser or terminal 111 that supports using a DASH manifest file 140 as a source for populating the AudioTrackList.

FIG. 3 shows an example protocol for presentation selection using the MSE API 122. Details regarding the MSE API 122 are specified in https://www.w3.org/TR/2016/REC-media-source-20161117, which is incorporated herein by reference.

As outlined in FIG. 3, the application 112 may download and parse a manifest file 140 from a network server 101. Furthermore, the application 112 may select a presentation 152 based on the data 141 provided within the manifest file 140. The presentation 152 may comprise a Preselection and/or an AdaptationSet. Furthermore, the application 112 may be configured to select the referenced asset and/or elementary stream 121 and download the initialization segment 160 for the selected stream 121. The presentation 152 may be comprised within one audio stream or several streams may participate with several initialization segments 160.

The application 112 may be further configured to send the one or more initialization segments 160 to the terminal 111 (e.g. using the SourceBuffer.appendBuffer( ) call). The terminal 111 may be configured to parse an initialization segment 160 (possibly using the decoder 113), in order to populate a list of AudioTrack objects for the presentations 152 signaled in the initialization segment 160.

The application 112 may be configured to retrieve the list of AudioTrack objects, e.g. from the AudioTracks attribute. Furthermore, the application 112 may be configured to match the AudioTrack objects to information 141 available within in the manifest file 140 or to a-priori information. The application 112 may be further configured to select playback of a presentation 152 by enabling the corresponding AudioTrack object.

The terminal 111 may configure the decoder 113 to play the selected presentation 152. Furthermore, the application 112 may be configured to download the media segments 170 for the selected presentation 152, and to send the media segments 170 to the terminal 111, e.g. using the SourceBuffer.appendBuffer( ) call.

In step 7 shown in FIG. 3, the terminal may have previously parsed the initialization segment 160 only to the minimum level necessary (typically, no further than the AudioSampleEntry), to determine whether audio is included. Specifically, the terminal 111 may have been configured to not parse into those parts of the initialization segment 160, which are datatype specific. Furthermore, the terminal 111 may have been configured to only parse into the first audio file track. In this case, the terminal 111 would have made available (at most) only one AudioTrack object per MSE source buffer, as specified in https://www.w3.org/TR/2016/REC-media-source-20161117/, section 1.2 (which is incorporated herein by reference). The resulting audio track object typically would have no specific relation to the number or type of presentations 152, which are comprised within the bitstream 121. Hence, if only minimal parsing of the initialization segment 160 is performed, the selection of a personalized presentation 152 is not possible.

In the present document, a terminal 111 is described, which is configured to derive from the initialization segment 160 the total number N of presentations 152 comprised in all file audio tracks of the initialization segment 160 and to instantiate N audio track objects corresponding to these N presentations 152. The terminal 111 may be configured to set the properties of the audio track objects matching the presentations 152. If the terminal 111 sets properties, the terminal 111 may be configured to apply the sort order defined in step 14 of FIG. 3.

With regards to step 10 of FIG. 3, it should be noted that the application 112 is typically provided by the same source as the media content (i.e. from the same broadcaster or content provider). As a result of this, the application 112 may be equipped with a-priori knowledge regarding the number, the type and/or the sort order of presentations 152 comprised within the media content. It may not be necessary for the AudioTrack objects to reflect the true properties of the underlying presentations 152 since the AudioTrack objects and/or the properties may already be identified by the order 162 of the AudioTrack objects within the list of AudioTrack objects.

The terminal 111 may be configured (in the context of step 14 of FIG. 3) to select one presentation 152 from a plurality of presentations 152. For this purpose, the list of AudioTrack objects may be sorted in a defined order and may be made available in this specific order to the application 112. The sorting order, which is used, should be known to the application 112 so that a presentation selection performed by the application 112 results in the selection of the right presentation 152.

A possible realization of such sort order is to determine the list of audio track objects for every contained file audio track in order of appearance, and for every contained presentation in order of appearance.

By way of example, the list of presentations 152 may be sorted into strictly ascending or descending order of a unique identifier of the different presentations 152, if such an identifier is available for each one of the different presentations 152. If such identifier is not available directly, but if the totality of presentation information contained in the initialization segment 160 uniquely identifies the different presentations individually, a hash over the presentation information of the different presentations may be used as an identifier. In other words, a hash over the presentation information for a particular presentation may be used to determine a unique identifier for this particular presentation. As a result of this, N hash values may be determined as unique identifiers for N different presentations (with N>1, e.g. N=2, 3, 4, 5 or more).

Alternatively, an unsorted list may be used. The terminal 111 may be configured to obtain the presentation IDs from the initialization segment 160 and set the ID element in the AudioTracks object to the same value. This enables the application 112 to map the Audio Tracks generated by the terminal 111 to the information presented in the preselection element by comparing the AudioTrack object IDs with the preselection tag element (from the manifest file 140.

An example regarding step 14 of FIG. 3 is provided in the context of Table 1. An initialization segment 160 may comprise two presentations: P2 and P1 (indicated in different sections 161, thereby providing a segment order 162 of the list of audio track objects). These presentations 152 can be sorted in an audio track list according to the two example methods outlined above:

TABLE 1

| Sort method A (by order of occurrence) | Sort method B (by identifier) |
|---|---|
| AudioTrack 1: P2 | AudioTrack 1: P1 |
| AudioTrack 2: P1 | AudioTrack 2: P2 |

In the above example, the application 112 may learn from the manifest file 150 of the audio signal that presentation 1 is regular audio and presentation 2 is audio for the visually impaired. The application 112 now needs to choose whether to enable AudioTrack 1 or AudioTrack 2. Assuming the application 112 wants to select the audio for the visually impaired, it needs to enable either AudioTrack 1 if Sort Method A was used or AudioTrack 2 if Sort Method B was used by the terminal 111. Hence, the application 112 may apply knowledge regarding the sort method which is applied by the terminal 111.

Hence, an application control method for audio processing is described. The method may comprise receiving a manifest file 140. Furthermore, the method may comprise selecting a presentation 152, e.g. at least an adaptation set or at least a preselection element, (from the manifest file 140). The presentation 152 may be selected based on the information 141 regarding the different presentations 152, which is provided within the manifest file 140. The manifest file 140 may be downloaded from a network server 101 and may be parsed for pointers identifying a presentation 152, notably at least an adaptation set or a preselection element.

The method may further comprise generating or receiving a list of available audio tracks based on selected presentation 152, e.g. the adaptation set or the preselection element, using the media source extensions API 122. The list of audio tracks may be generated by the terminal 111.

In the context of the method, an initialization segment 160 may be downloaded from a network server 101. Furthermore, the initialization segment 160 may be sent to the terminal 111 through the media source extensions API 122. The terminal 111 may parse the initialization segment 160 for generating the list of available AudioTrack objects. The list of AudioTrack objects may be provided to the application 112 via the MSE API 122.

The terminal 111 may be configured to generate the list of available AudioTrack objects according to a specified order, e.g. the segment order 162 corresponding to the order of appearance within the initialization segment 160. In other words, the specified order may be the order of appearance in the initialization segment 160. Alternatively, or in addition, the specified order may be an ascending or descending order of a unique identifier of the AudioTrack objects. The unique identifier may be derived from the presentation properties that are indicated within the initialization segment 160 using a hashing algorithm.

The selection step may use the list of available AudioTrack objects, and one or more objects may be identified by index into the list. The terminal 111 may be configured to assign the presentation ID to the ID of AudioTrack objects. The list of AudioTrack objects may be updated based on information obtained from media segments 170 containing the media (notably the audio content).

Figure 4A:
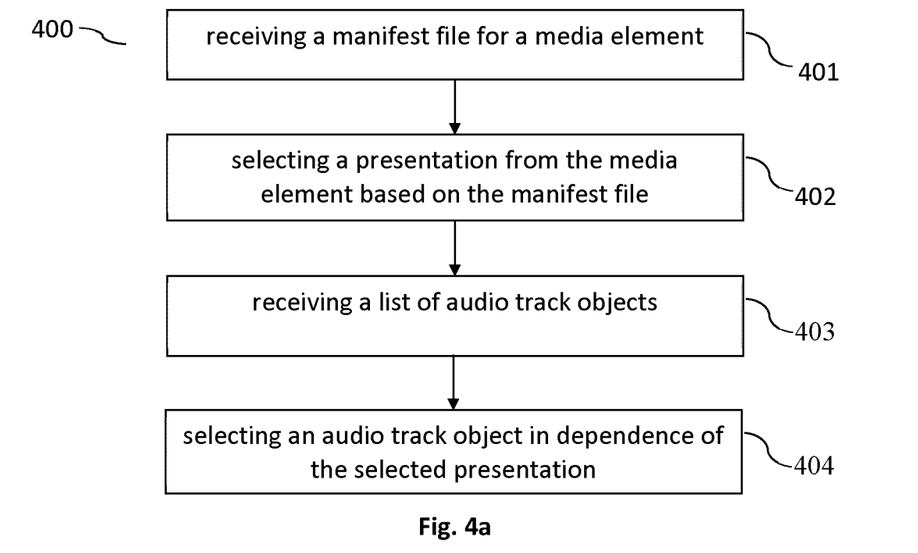
FIG. 4a shows a flow chart of an example method for providing a personalized presentation (executed e.g. by a software application)

FIG. 4a shows a flow chart of an example method 400 for providing personalized audio to a user. The audio may be comprised within a media element, notably an HTML 5 media (e.g. audio) element. The media element may comprise different audio components 181, which may be combined in different manners to provide different presentations 152. The different presentations 152 may be specified as one or more Adaptation Sets and/or Preselections. The method 400 may be executed by an application 112 (or a device running the application) within an HbbTV system 100.

The method 400 may comprise receiving 401 a manifest file 140 for a media element from which audio is to be rendered. The manifest file 140 may be downloaded from a network server 101. The manifest file 140 may be a Dynamic Adaptive Streaming over HTTP, referred to as DASH, manifest file. The manifest file 140 may comprise a description 141 for a plurality of different presentations 152 of audio content of the media element. The plurality of presentations 152 which is indicated within the manifest file 140 may comprise one or more Preselections and/or Adaptation Sets, notably DASH Preselections and/or Adaptation Sets.

Hence, parsing the manifest file 140 may be performed to determine a plurality of presentations 152, notably an ordered list of presentations 152.

The method 400 further comprises selecting 402 a presentation 152 from the plurality of presentations 152 based on the manifest file 140, notably based on the descriptions 141 of the different presentations 152. The selection may be performed by the user (e.g. via a user interface of the application or the device running the application).

In addition, the method 400 comprises receiving 403 a list of audio track objects comprised within the media element. The list of audio track objects may be received from a terminal 111 of the HbbTV system 100. In particular, the list of audio track objects may be received via a media selection extension (MSE) application programming interface 122 (API), notably an HTML 5 MSE API.

The method 400 may further comprise selecting 404 an audio track object from the list of audio track objects, in dependence of the selected presentation 152. In particular, the audio track object corresponding to the selected presentation 152 may be selected (and used for rendering). By doing this, a reliable and efficient personalization of audio may be provided within an HbbTV system 100.

Furthermore, the method 400 may comprise retrieving at least one media segment for the selected audio track object. The one or more media segments (comprising the actual audio to be rendered) may be received from a network server 101, which may be assigned to the same content provider which provides the manifest file 140. The at least one media segment for the selected audio track object may then be provided to the terminal 111 for rendering of the selected presentation 152.

The audio track object may be selected from the list of audio track objects in dependence of information regarding the order 162 of audio track objects within the list of audio track objects. In particular, the audio track object may be selected from the list of audio track objects in dependence of information regarding the order 162 of audio track objects within the list of audio track objects relative to the order 142 of the description 141 for the plurality of different presentations 152 within the manifest file 140. The information regarding the ordering may be available due to the fact that the manifest file 140 and the initialization segment 160 are provided by the same content provider, and/or due to the fact that the application 112 is provided by the same content provider as the manifest file 140 and the initialization segment 160. By taking into account information regarding the ordering of the list of audio track objects, a reliable selection of personalized audio content is enabled.

The manifest file 140 may be such that the order 142 of the description 141 for the plurality of different presentations 152 corresponds to, notably is identical to, the order 162 of audio track objects within the list of audio track objects, thereby enabling a reliable selection of personalized audio content.

The manifest file 140 may be such that the description 141 for the plurality of different presentations 152 is indicative of a numerical identifier for each one of the plurality of different presentations 152. Furthermore, the order 162 of audio track objects within the list of audio track objects may correspond to a predetermined, notably an ascending or descending, order of the numerical identifiers of the plurality of different presentations 152. By making use of numerical identifiers and/or a pre-determined ordering according to the numerical identifiers, a reliable selection of personalized audio content is enabled.

The manifest file 140 may comprise presentation information for each one of the plurality of different presentations 152, notably within the description 141 for the plurality of different presentations 152. The same presentation information may also be comprised within the initialization segment 160 of the media element.

The method 400 may comprise determining a unique identifier for each one of the plurality of different presentations 152 based on the presentation information for each one of the plurality of different presentations 152, respectively, notably using a hashing algorithm. The determined identifiers may then be used to selecting an audio track object from the list of audio track objects, thereby enabling a reliable selection of personalized audio content.

Figure 4B:
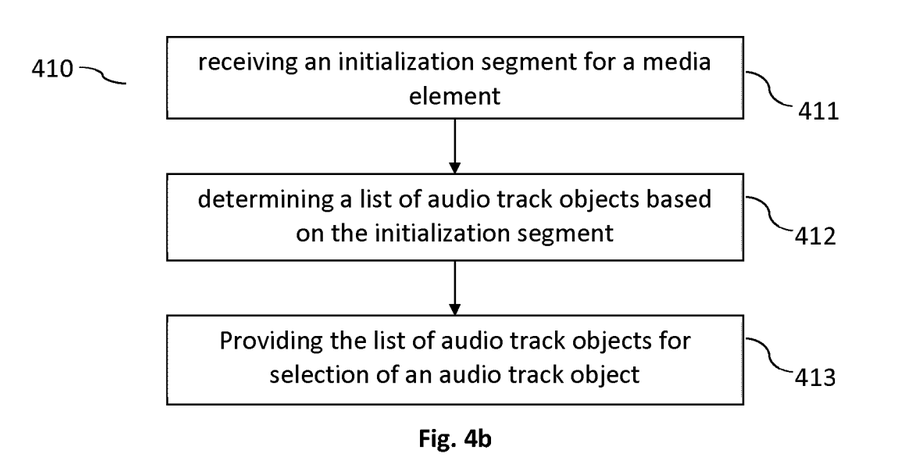
FIG. 4b shows a flow chart of an example method for providing a personalized presentation (executed e.g. by a terminal or browser of a TV set).

FIG. 4b shows a flow chart of another method 410 for providing personalized audio to a user. The method 410 may be executed by a terminal 111 within a HbbTV system 100. As such, the method 410 may comprise method steps which are complimentary and/or corresponding to the method steps of method 400 (which may be executed by a corresponding application 112 within the HbbTV system 100).

The method 410 comprises receiving 411 an initialization segment 160 for the media element from which audio is to be rendered (e.g. from the network server 101 of the content provider). In addition, the method 410 comprises determining 412 a list of audio track objects for a plurality of different presentations 152 of the media element, based on the initialization segment 160. In particular, the initialization segment 160 may be parsed for determining 412 the list of audio track objects. The list of audio track objects may be an ordered list, wherein the order of the list may be known to the application 112.

The method 410 further comprises providing 413 the list of audio track objects for selection of one of the audio track objects for one of the plurality of different presentations 152. The list of audio track objects may be provided to an application 112 of the HbbTV system 100. In addition, the method 410 may comprise receiving at least one media segment 170 for a selected audio track object and/or rendering the at least one media segment 170 using a decoder 113. Hence, a method 410 is described which allows for a reliable selection and rendering of personalized audio content.

The list of audio track objects may be ordered in dependence of, notably in accordance to, the order 162 of appearance of initialization sections 161 for the different audio track objects within the initialization segment 160. By using such ordering of the list of audio track objects a reliable selection and rendering of personalized audio content is enabled.

Alternatively, or in addition, the method 410 may comprise ordering the list of audio track objects in dependence of unique identifiers for each one of the plurality of different presentations 152 and/or for each one of the corresponding plurality of audio track objects.

The initialization segment 160 may comprise presentation information for each one of the plurality of different presentations 152. The method 410 may comprise determining a unique identifier for each one of the plurality of different presentations 152 and/or for each one of the corresponding plurality of audio track objects based on the presentation information for each one of the plurality of different presentations 152, respectively, notably using a hashing algorithm. By making use of unique identifiers, a reliable selection and rendering of personalized audio content is enabled.

Furthermore, an application 112 and a terminal 111, i.e. devices and/or apparatuses, are described in the present document, which are configured to execute the methods 400 and 410, respectively.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

The invention claimed is:

1. A method for providing personalized audio to a user, wherein the method comprises:
   receiving, by a receiver, a manifest file for a media element from which audio is to be rendered, wherein the manifest file comprises a description for a plurality of different presentations of audio content of the media element, the receiver configured for receiving delivery of broadcast and broadband services;
   initializing a media element pointing to the manifest file;
   generating, by the receiver, an audio track object list comprising audio track objects which are available in the media element, wherein each audio track object is an entity derived from a common set of audio components of the media element, wherein the audio components are configured to be switched on or off;
   sending, by the receiver, the audio track object list to an application, wherein the audio track object list is received by the application through a communication interface between the application and the receiver, wherein the communication interface is enabled for personalization by allowing different presentations known to the application to be matched to the plurality of different presentations in the manifest;
   matching, by the application, the audio track objects in the audio track object list to information regarding the plurality of different presentations available in the manifest file;
   selecting, by the application, a presentation from the plurality of presentations based on the matching by enabling one or more audio track objects in the audio track object list corresponding to the selected presentation; and
   selecting, by the application, an audio track object from the audio track object list based on the selected presentation, wherein the audio track object is selected from the audio track object list based on an order of audio track objects within the audio track object list relative to an order of the description for the plurality of different presentations.

2. The method of claim 1, further comprising:
retrieving at least one media segment for the selected audio track object; and
providing at least one media segment for the selected audio track object for rendering of the selected presentation.

3. The method of claim 1, wherein the manifest file is such that the order of the description for the plurality of different presentations corresponds to the order of audio track objects within the audio track object list.

4. The method of claim 1, wherein
the description for the plurality of different presentations is indicative of a numerical identifier for each one of the plurality of different presentations; and
the order of audio track objects within the audio track object list corresponds to a predetermined order of the numerical identifiers of the plurality of different presentations.

5. The method of claim 1, wherein the audio track object list is received via a media selection extension (MSE) application programming interface (API).

6. The method of claim 1, wherein the manifest file is a Dynamic Adaptive Streaming over HTTP (DASH) manifest file.

7. The method of claim 1, wherein the manifest file and at least one media segment for the selected audio track object are received from one or more network servers.

8. The method of claim 1, wherein the plurality of presentations indicated within the manifest file comprises one or more Preselections or Adaptation Sets.

9. The method of claim 1, wherein the receiving is performed by an application within a Hybrid broadcast broadband TV (HbbTV) system; and the audio track object list is received from a terminal of the HbbTV system.

10. The method of claim 1, further comprising determining a unique identifier for each one of the plurality of different presentations.

11. A method for providing personalized audio to a user in a Hybrid broadcast broadband TV (HbbTV) environment, wherein the method comprises:
receiving, by an application, an initialization segment for a media element from which audio is to be rendered, the initialization segment received from a network server;
sending, by the application, the initialization segment to a receiver configured to receive delivery of broadcast and broadband services, the initialization segment sent to the receiver through a communication interface between the application and the receiver, wherein the communication interface is enabled for personalization by allowing different presentations known to the application to be matched to the plurality of different presentations in the initialization segment;
receiving, by a receiver, the initialization segment through the communication interface;
generating, by the receiver, an audio track object list comprising audio track objects, wherein each audio track object is an entity derived from a common set of audio components of the media element, wherein the audio components are configured to be switched on or off, and wherein the audio track object list is ordered based on an order of appearance of initialization sections for the different audio track objects within the initialization segment;
sending, by the receiver, the audio track object list to the application through the communication interface;
matching, by the application, the audio track objects in the audio track object list to information regarding the plurality of different presentations available in the initialization segment; and
providing the audio track list for selection of one of the audio track objects for one of the plurality of different presentations.

12. The method of claim 11, further comprising:
receiving at least one media segment for a selected audio track object; and
rendering the at least one media segment.

13. The method of claim 11, further comprising parsing the initialization segment for determining the audio track object list.

14. The method of claim 11, further comprising ordering the audio track object list based on unique identifiers for each one of the plurality of different presentations and for each one of the corresponding plurality of audio track objects.

15. The method of claim 11, further comprising determining a unique identifier for each one of the plurality of different presentations, and, for each one of the corresponding plurality of audio track objects based on presentation information for each one of the plurality of different presentations, wherein the initialization segment comprises the presentation information for each one of the plurality of different presentations.

16. A system for providing personalized audio to a user, the system comprising:
a receiver configured for receiving delivery of broadcast and broadband services, the receiver for performing operations comprising:
receiving a manifest file for a media element from which audio is to be rendered, wherein the manifest file comprises a description for a plurality of different presentations of audio content of the media element;
initializing a media element pointing to the manifest file;
generating an audio track object list comprising audio track objects which are available in the media element, wherein each audio track object is an entity derived from a common set of audio components of the media element, wherein the audio components are configured to be switched on or off;
sending the audio track object list to an application through a communication interface between the receiver and the application, wherein the communication interface is enabled for personalization by allowing different presentations known to the application to be matched to the plurality of different presentations in the manifest;
matching, by the application, the audio track objects in the audio track object list to information regarding the plurality of different presentations available in the manifest file;
selecting, by the application, a presentation from the plurality of different presentations based on the matching by enabling one or more audio track objects in the audio track object list corresponding to the selected presentation; and
selecting, by the application, an audio track object from the audio track object list based on the selected presentation, wherein the audio track object is selected from the audio track object list based on an order of audio track objects within the audio track object list relative to an order of the description for the plurality of different presentations.

17. A HbbTV system for providing personalized audio to a user, the system comprising:
   a receiver for:
      receiving, from an application of the HbbTV system, an initialization segment for a media element from which audio is to be rendered, the initialization segment received through a communication interface between the application and the receiver, wherein the communication interface is enabled for personalization by allowing different presentations known to the application to be matched to the plurality of different presentations in the initialization segment;
      generating an audio track object list comprising audio track objects, wherein each audio track object is an entity derived from a common set of audio components of the media element, wherein the audio components are configured to be switched on or off, and wherein the audio track object list is ordered based on an order of appearance of initialization sections for the different audio track objects within the initialization segment;
      sending the audio track object list to the application of the HbbTV system through the communication interface;
      matching, by the application, the audio track objects in the audio track object list to information regarding the plurality of different presentations available in the initialization segment; and
   a renderer for providing the audio track object list for selection of one of the audio track objects for one of the plurality of different presentations to the application of the HbbTV system.

* * * * *